US008904883B2

(12) United States Patent
Clegg et al.

(10) Patent No.: US 8,904,883 B2
(45) Date of Patent: Dec. 9, 2014

(54) LOAD CELL FOR MONITORING TORSION AND HAVING OVERLOAD PROTECTION

(76) Inventors: LaVar Clegg, Scottsdale, AZ (US);
Lawrence J. Burrow, Fountain Hills, AZ (US)

(\*) Notice: Subject to any disclaimer, the term of this patent is extended or adjusted under 35 U.S.C. 154(b) by 0 days.

(21) Appl. No.: 13/425,362

(22) Filed: Mar. 20, 2012

(65) Prior Publication Data
US 2012/0180574 A1    Jul. 19, 2012

Related U.S. Application Data

(63) Continuation of application No. 12/586,996, filed on Sep. 29, 2009, now Pat. No. 8,161,828.

(51) Int. Cl.
*G01L 1/04* (2006.01)
*G01L 3/00* (2006.01)
*G01L 3/14* (2006.01)

(52) U.S. Cl.
CPC ............................... *G01L 3/1457* (2013.01)
USPC .............. 73/862.338; 73/862.321; 73/862.08; 73/862.632; 73/862.637; 73/862.625; 73/862.621

(58) Field of Classification Search
USPC ...................... 73/862.632, 862.621, 862.622, 73/862.627, 862.628, 862.08, 862.191, 73/862.21, 862.321, 862.325, 862.338, 73/862.04–862.045
See application file for complete search history.

(56) References Cited

U.S. PATENT DOCUMENTS

| | | | | |
|---|---|---|---|---|
| RE26,302 E | * | 11/1967 | Seed et al. | 73/862.622 |
| 3,552,199 A | * | 1/1971 | Pugnaire et al. | 73/862.08 |
| 4,094,192 A | * | 6/1978 | Watson et al. | 73/862.044 |
| 4,162,628 A | * | 7/1979 | Oetjen et al. | 73/862.622 |
| 4,196,337 A | * | 4/1980 | Jewett et al. | 219/121.35 |
| 4,723,450 A | * | 2/1988 | Coulter | 73/862.191 |
| 4,907,168 A | * | 3/1990 | Boggs | 702/41 |
| 4,911,024 A | * | 3/1990 | McMaster | 73/862.045 |
| 5,063,788 A | * | 11/1991 | Ch'Hayder et al. | 73/862.043 |
| 5,490,427 A | * | 2/1996 | Yee et al. | 73/767 |
| 5,714,695 A | * | 2/1998 | Bruns | 73/862.641 |
| 5,847,290 A | * | 12/1998 | Kim | 73/862.641 |
| 5,872,319 A | * | 2/1999 | Bruns et al. | 73/862.641 |
| 5,925,832 A | * | 7/1999 | Bruns | 73/862.635 |
| 6,257,075 B1 | * | 7/2001 | Bachnak | 73/862.322 |
| 8,291,775 B2 | * | 10/2012 | Nagasaka et al. | 73/862.338 |

\* cited by examiner

*Primary Examiner* — Jewel V Thompson
*Assistant Examiner* — Jonathan Dunlap
(74) *Attorney, Agent, or Firm* — Paul B. Heynssens Attorney at Law PLC

(57) ABSTRACT

A load cell structure for receiving strain gages to monitor applied torsional forces wherein the opposing force-receiving ends have a plurality of sensing beams spaced about an axis of rotation. Limit posts located between the ends each have a discontinuity therein that includes a U-shaped gap to limit relative rotation about the axis and thereby providing overload protection.

13 Claims, 5 Drawing Sheets

LOAD CELL FOR MONITORING TORSION AND HAVING OVERLOAD PROTECTION

CROSS-REFERENCE TO RELATED APPLICATION(S)

This application is a continuation of U.S. patent application Ser. No. 12/586,996 filed Sep. 29, 2009, the contents of which are hereby incorporated by reference.

TECHNICAL FIELD

This invention relates to load cells and more particularly relates to load cells that monitor torsional forces and load cells that include overload protection.

BACKGROUND

In general, a load cell monitoring torsional force includes as elements formed in a resilient body opposing; load-receiving ends spaced along an axis of rotation and a number of sensing beams aligned with the axis extending between the ends. The sensing beams have strain gages applied thereto. The torque applied to the structure results in torsional forces producing dimensional changes in the sensing beams. The electrical strain gages are sensitive to the changes and an accurate reading of the applied load is derived by external measurement apparatus.

One of the many advantages of a load cell is the lack of individual mechanical parts that are responsive to applied loads and therefore subject to wear from repeated use. The rendering of repeatable and accurate readings by load cells relies primarily on the structural integrity of the design and the materials used in the load cell structure. Thus, a unitary design relying on a single structural member provides advantages. The application of forces in excess of the rated capacity can alter the geometry of the load cell structure thereby introducing errors into subsequent readings. Both accuracy and precision can be adversely affected by loading in excess of ratings.

To compensate for the application of excessive loading of the structure, overload protection is often incorporated into the load. The provision of overload protection in load cells used in the measurement of linear or non-rotational forces is discussed in U.S. Pat. No. 6,755,087 to Clegg wherein a cantilever beam hounded by two sensing beams is provided in a unitary structure. The linear forces are applied to the opposing ends of the structure thereby causing the sensing beams to deflect. By the use of narrow slots machined into the load cell structure, excess loading results in contact of the sensing beams with the cantilever beam to transfer loads thereto and thus provides overload protection for the structure.

The torsion monitoring load cell, unlike conventional linear force measuring load cells, monitors torque occurring about an axis of rotation. As a result, the elements of a unitary structure are both aligned with the axis of rotation and disposed therearound. The incorporation of overload protection into a torsion monitoring load cell of unitary structures is not readily accomplished. Attempts have been made to provide independent mechanical stops in order to limit relative rotations of the force-receiving ends. The use of mechanical stops is not favored for they are difficult to set, often engage early giving rise to false readings and fail to provide reliable protection. The omission of overload protection is often compensated for by designing a load cell tolerating high levels of sensing beam distortion. The materials in the high deflection load cells exhibit less stiffness and are less responsive to changing loads. Frequency response is important in many torsional load cell applications.

Accordingly, the present invention is directed to a load cell structure for monitoring torsional forces having overload protection incorporated into a single unitary structure without requiring the use of additional parts. The structure provides bidirectional protection of the load cell against both sudden impact forces and torque in excess of rated capacity. The unique constructional features of the present load cell facilitate the manufacture thereof while providing integral overload protection.

SUMMARY

The present invention is directed to a load cell structure of the type receiving strain gages applied thereto for the measurement of forces and, in particular, the measurement of torsional forces. The load cell structure comprises a body of resilient material having opposing force-receiving ends spaced along the axis of rotation. Each end has a central region bounded by a peripheral region. A plurality of sensing beams having strain gage receiving surfaces thereon extend between the ends in alignment with the axis of rotation. At least one limit post is attached to the second force-receiving end and is aligned with the axis of rotation.

The limit post has a free end which is spaced from the first force-receiving end. The spacing represents a discontinuity in the structure in contrast to the interconnection between sensing beams and force-receiving ends.

The free end is provided with at least one pair of contact surfaces oriented in alignment with the axis of rotation. The contact surfaces are spaced from the first end to establish a pair of overload gaps. The contact surfaces establish bidirectional overload protection in the situation where the torsional force applied to the structure causes relative rotation of the first and second ends that exceeds the designed gap width.

During measurement of the torsional force, the sensing beams undergo dimensional change and the strain gages affixed thereto experience change which is manifested in an electrical signal. The relative rotation of ends continues until one overload gap closes and the contact surface resides against the adjacent portion of the first end. The mass of the limit arm then serves to protect the load cell structure from permanent deformation which would alter accuracy and precision of measurement.

Further features and advantages of the present invention will become more readily apparent from the following detailed description of a preferred embodiment when taken in conjunction with the accompanying drawings.

DESCRIPTION OF THE DRAWINGS

The above and other advantages and objects of the present invention will become apparent from the following description, claims and drawings in which:

DETAILED DESCRIPTION

Figure 1:
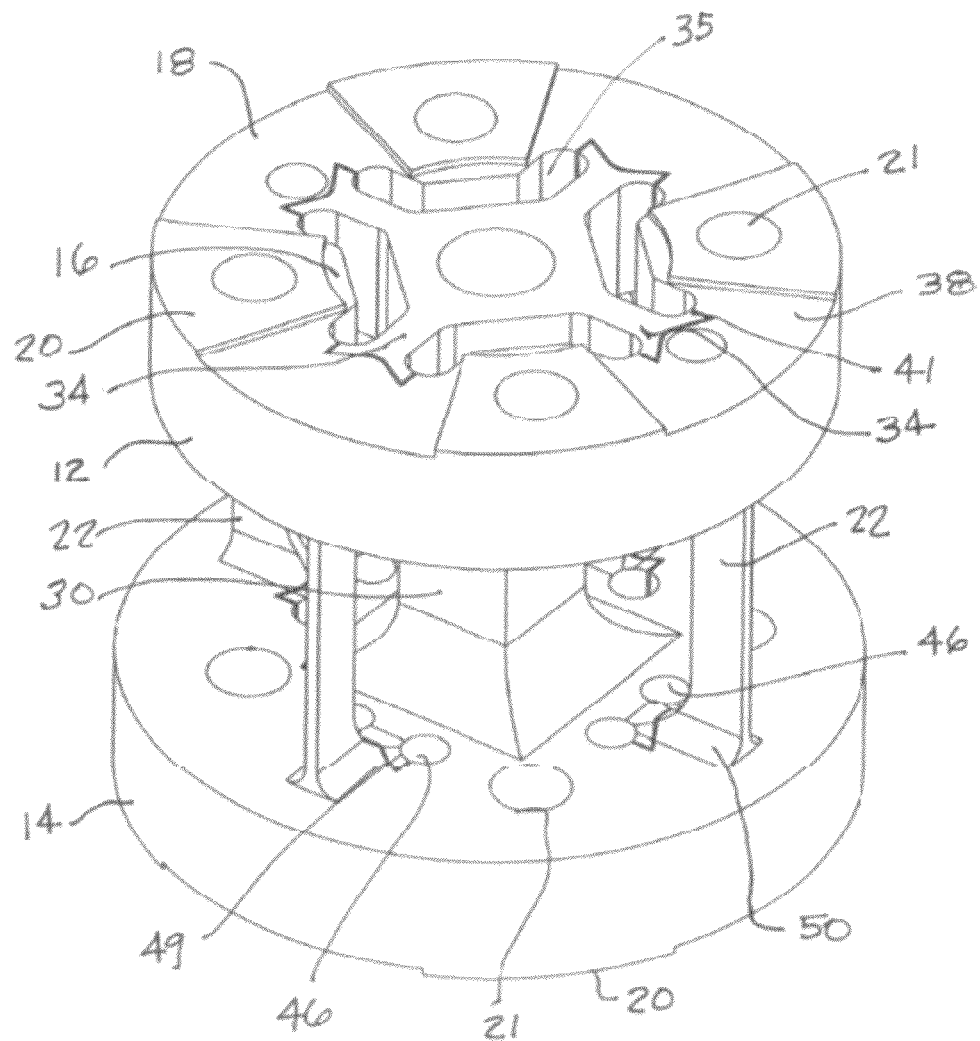
FIG. 1 is a perspective view of a preferred embodiment of the present invention.
Figure 2:
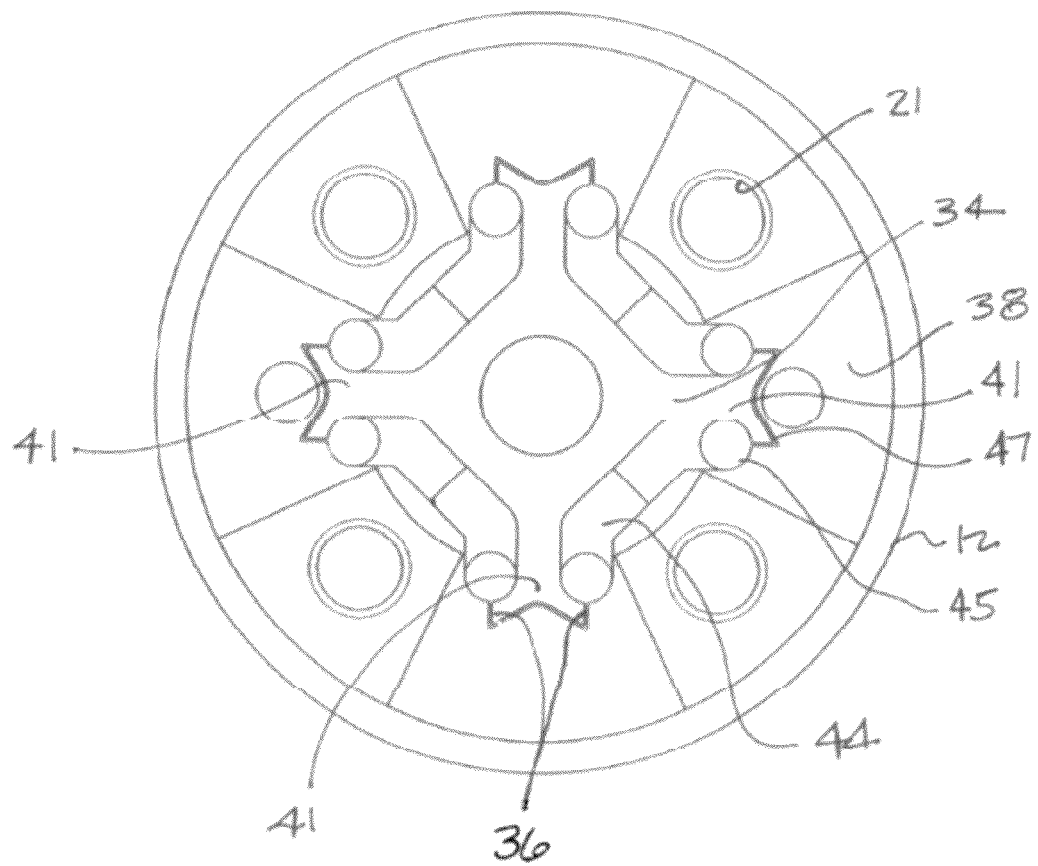
FIG. 2 is a top view of the embodiment of FIG. 1.
Figure 3:
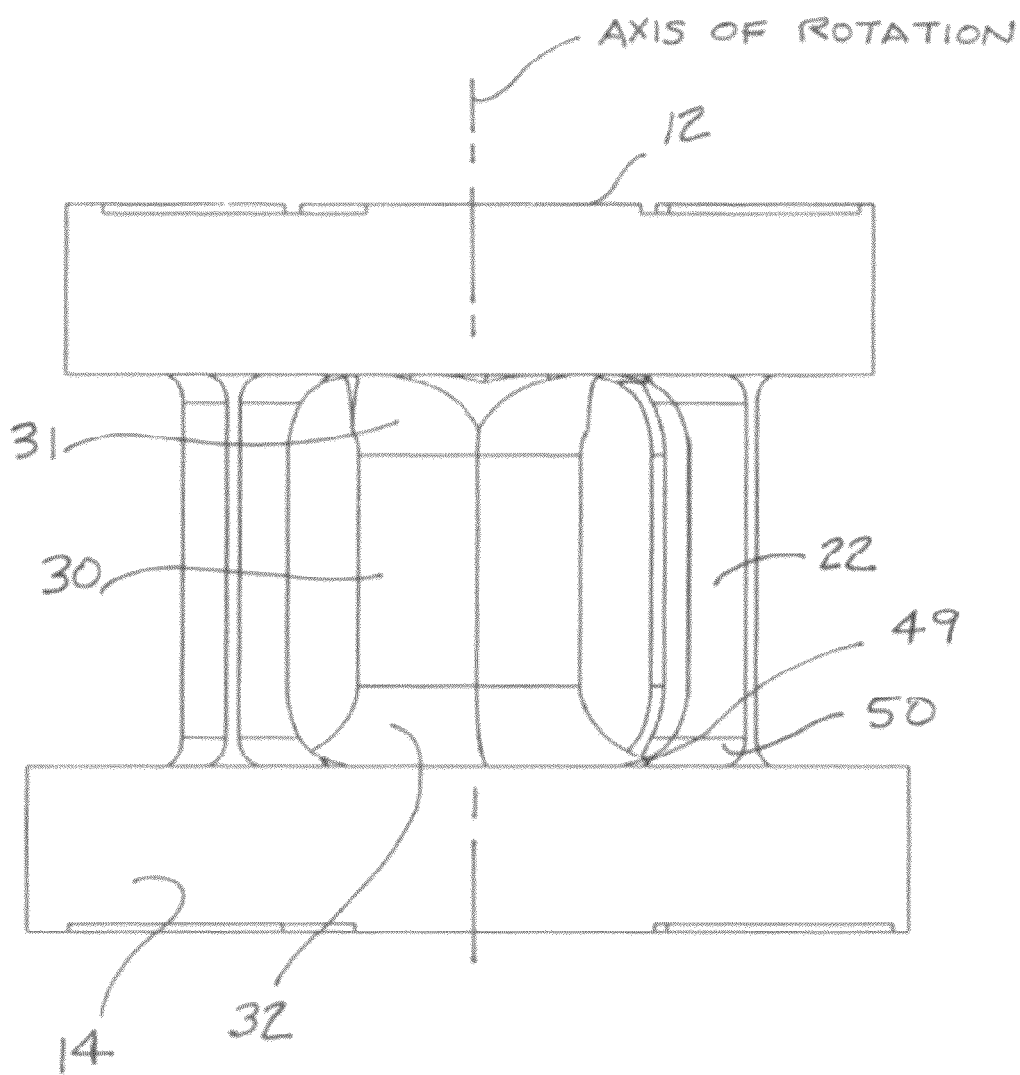
FIG. 3 is a side view of the embodiment of FIG. 1.

Referring now to FIGS. 1, 2 and 3, showing a preferred embodiment, the load cell structure of the present invention is shown formed of a single body of resilient material, typically a steel alloy, or an aluminum alloy having a number of beams, slots and openings formed between two disc-shaped ends. The components of the load cell structure are formed by conventional machining techniques. As shown, the structure is generally cylindrical and symmetrical about the central axis which is referred to herein as the axis of rotation.

The first force-receiving end 12 includes a central region 16 and a peripheral region 18 extending therearound. The peripheral region has four raised contact pediments 20 formed therein. The pediments 20 are arranged at 90°. Each pediment contains a mounting hole 21 to permit attachment to an external force transmission shaft or the like. The second force-receiving end 14 has a like arrangement of pediments 20 and threaded mounting holes 21 for affixation to an external device. Since the load cell structure of the present invention is employed in a variety of test machines, medical equipment and encoders the external devices are not shown in the drawings.

As shown in FIGS. 1 and 3, the force-receiving ends 12 and 14 are connected by force sensing beams 22 extending between the peripheral regions thereof. The beams are machined into the block of resilient material from which the structure is fabricated. The beams are provided with tapered ends to provide support and greater mass near the end portions. The flat sections of the sensing beams are utilized for the placement of strain gages thereon.

A limit post 30 extends from the second force-receiving end 14 along the axis of rotation and terminates in a central opening in end 12. The base of post 30 is square in cross-section at the inner surface of end 14. The beam is inwardly tapered at end 32 and extends upwardly to an outward tapered section 31. The axial length of the upper and lower tapered sections 31 and 32 respectively are equal as shown in FIG. 3. However, tapered section 31 extends into the central opening 35 in the central region 16 of first end 12. Each side of the sections 31 include a web 34 extending outwardly from the axis of rotation. Contact surfaces 36 are provided at the distal end of each web. The limit post 30 is provided in this embodiment with four web members 34 spaced in correspondence with the sensing beam. The limit post is functionally the equivalent of four posts serving to provide primary overload protection for a nearby sensing beam.

The limit post 30 terminates at the level of the adjacent recessed surfaces 38 so that the webs 34 are free to rotate about the axis when the first and second ends are attached to the force imparting elements. Each web terminates in a foot 41 that is received in an adjacent recess shown as slot 47 formed in the peripheral region of first end 12, as seen in FIG. 2. In FIG. 2, each foot 41 has a pair of opposing contact surfaces 36 that can engage the walls of the adjacent V-shaped slot 47 upon sufficient relative rotation of the first and second ends. In this embodiment, the limit post 30 moves in accordance with the second end while the first end movement appears in movement of the V-shaped slot 47. If the second end is affixed to a reference surface, the movement occurs with the first end. The width of the gap between the contact surfaces 36 and the sides of the adjacent V-shaped slot 47 determines the amount of torque required to initiate the overload protection.

The structure of the load cell is seen in the top view of FIG. 2 wherein the webs 34 establish overload limiters spaced about the central region of the first end 12. The webs are bounded by angular openings 44 extending between holes 45. The openings 44 are machined through the top surface of end 12 and extend through end 12 as shown by bottom openings 46 in FIG. 1. An opening 46 is located at each corner of the limit post 30. The through holes 45 at the opposing sides of foot 41 are interconnected by the adjacent V-shaped slot 47. The contact surfaces of the free end of foot 41 engage the adjacent portions of first end 12 when the relative rotation between the first and second ends equals the distance therebetween. The load cell structure of the present invention is a unitary device formed from a single block of resilient material. The mounting holes 21 are located in the raised portions 20 of the peripheral region of the first end so that the relative rotation is not impeded.

The sensitivity of sensing beams 22 is enhanced by the formation of transverse slots 49 located at the inwardly extending base 50 of each sensing beam. The slots 49 each extend between the through holes 46 in the second end and are formed when the like slots 42 are formed in the first end. In operation, the application of torque between the opposing ends 12 and 14 causes the sensing beams 22 to undergo a dimensional change which is limited by the distance that the feet on the webs 41 can rotate about the central axis. When the movement causes the pairs of contact surfaces 36 to engage the first end and closing over the load gap, the torsional forces are shared by the four webs on the limit post and the sensing beams. The characteristics of the material employed and the size of the overload gap primarily determine the amount of protection provided.

Figure 4:
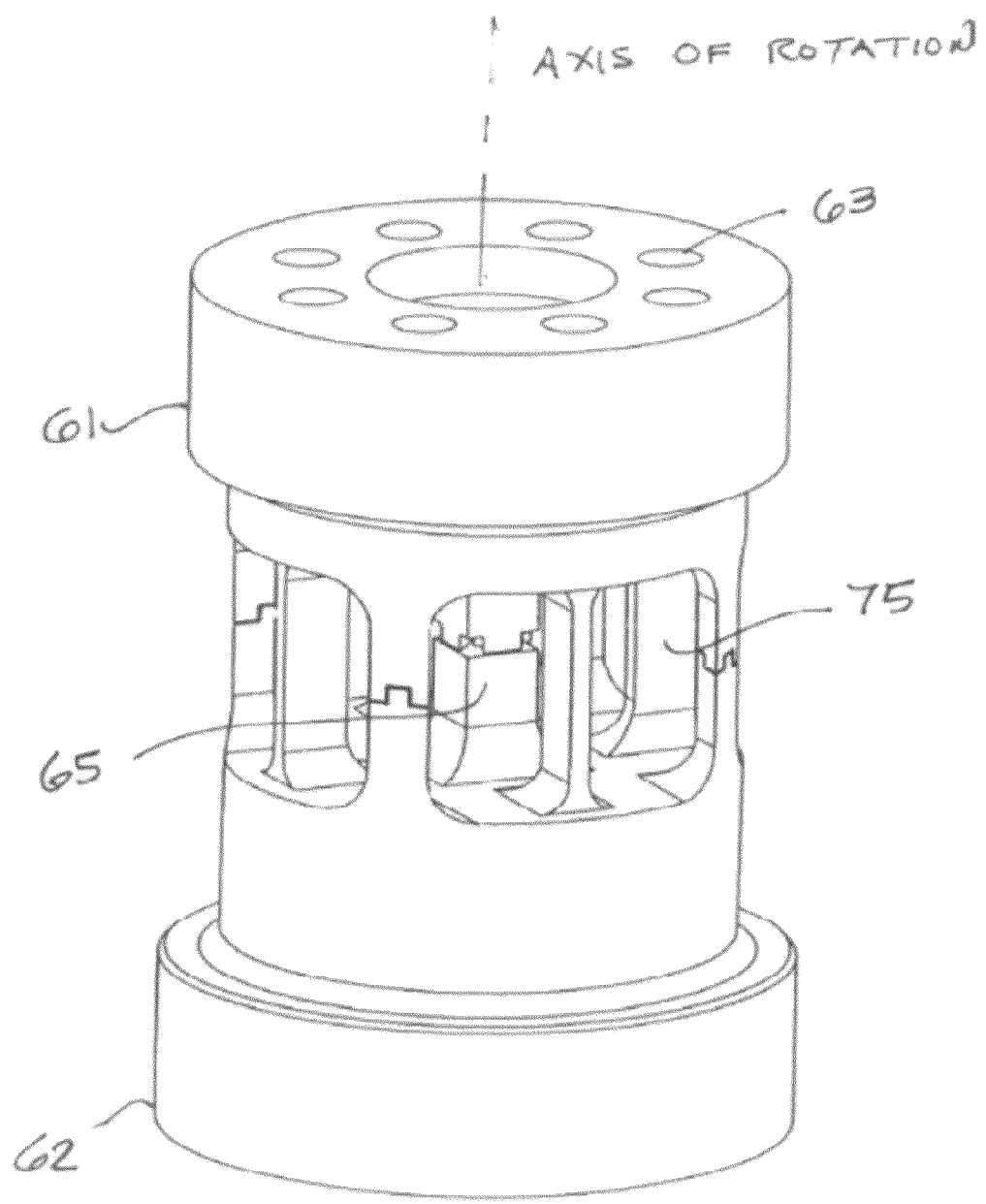
FIG. 4 is a perspective view of a second embodiment of the present invention.
Figure 5:
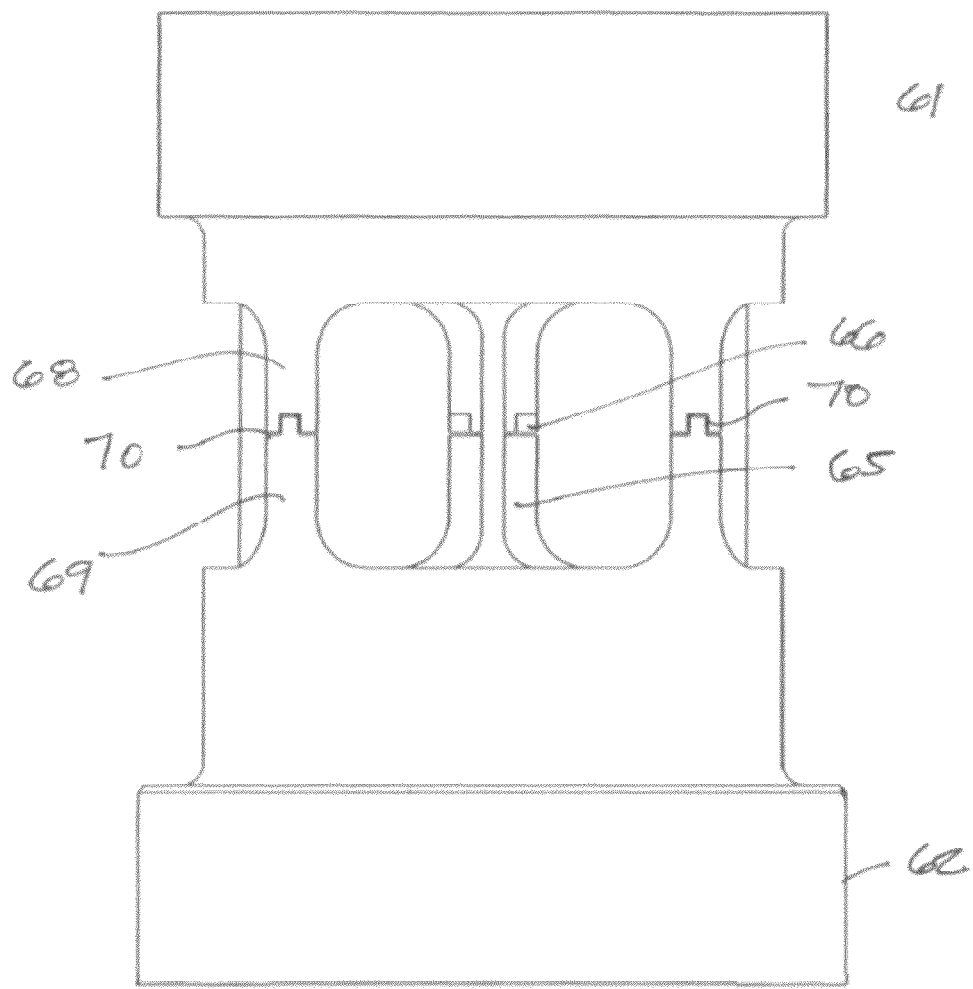
FIG. 5 is a side view of the embodiment of FIG. 4.

A second embodiment of the invention is shown in FIGS. 4 and 5 wherein the geometry of the structure is modified to reduce the machining steps required during manufacture. This embodiment has first and second force-receiving ends 61 and 62, each having a plurality of aligned mounting holes 63 therein. The holes in each end are aligned with a corresponding hole and spaced about the axis of rotation. The embodiment utilizes four distinct limit posts spaced in the peripheral regions of the ends. Each limit post is comprised of limit arms 68 and 69.

As shown, the embodiment of FIGS. 4 and 5 is well-suited for smaller size measuring devices. The use of individual limit posts and the corresponding engaging posts is in contrast to the multiple limit beams formed by the webs extending from the large central mass of the post in the first embodiment typically reduces size and capacity while facilitating manufacture. This embodiment of the present invention is seen in FIGS. 4 and 5 to include a central post 65 extending between the opposing force-receiving ends. The central post is discontinuous with a slot 66 machined therethrough. While the central post 65 is non-functional for torsional loading, the post 65 can be utilized for protection from axial high impact loads by making the slot 66 narrower than the overload protection slots 70 between the limit arms 69 and the mating engaging arms 68, referred to herein as limit posts. As shown, the four limit posts are angularly disposed about the central axis of rotation. The limit posts have a discontinuity therein which extends across the post. Thus, the upper and lower sections of the limit posts are able to undergo relative rotation when a torsional force is applied to the load cell structure. This discontinuity is shown as a U-shaped slot 70 machined into each of the four posts. The vertical sides of the slots are aligned with the axis of rotation and provide the contact surfaces for overload protection.

In operation, the first and second force-receiving ends 61, 62 experience relative rotation upon the application of torque to the first end 61 whereby the sensing beams 75 undergo dimensional change. In contrast, the upper and lower arms 68, 69 of the limit posts rotate until the contact surfaces of the slots 70 abut one another. At this point, the resistance to further rotation greatly increases and the sensing beams 75 are not further deformed. The slot width is the spacing between the contact surfaces aligned with the axis of rotation. The width of slots 70 primarily determine the limit at which overload protection takes effect in the load cell structure.

While the foregoing description of the present invention has been in reference to the several embodiments shown, it is to be noted that modifications and variations may be made therein without departing from the scope of the invention as set forth in the accompanying claims.

It will be obvious to those skilled in the art to make various changes, alterations and modifications to the invention described herein. To the extent such changes, alterations and modifications do not depart from the spirit and scope of the appended claims, they are intended to be encompassed therein.

The invention claimed is:

1. A load cell structure comprising:
    a first force-receiving end having a first central region bounded by a first peripheral region;
    a second force-receiving end having a second central region bounded by a second peripheral region, the first and second ends being spaced along an axis of rotation;
    a plurality of sensing beams extending between the first and second peripheral regions;
    at least one limit post attached to the second force-receiving end and aligned with the axis of rotation, the at least one limit post having a free end spaced from the first force-receiving end; and
    a pair of contact surfaces formed on the free end, the pair of contact surfaces being oriented in alignment with the axis of rotation to establish a pair of overload gaps between the free end and the force-receiving end.

2. The load cell of claim 1 wherein the at least one limit post has a plurality of pairs of contact surfaces, establishing a like plurality of overload gaps between the first and second force-receiving ends.

3. The load cell of claim 2 wherein the plurality of pairs of contact surfaces are spaced about the axis of rotation.

4. The load cell of claim 3 wherein the plurality of pairs of contact surfaces are spaced outwardly from the axis of rotation and located adjacent to the first peripheral region in the first force-receiving end.

5. The load cell of claim 4 wherein the first force-receiving end has an opening in the first central region, the free end of the at least one limit post extending into the opening, the free end being adjacently spaced from the first force-receiving end.

6. The load cell of claim 5 wherein the first force-receiving end includes a plurality of recesses spaced outwardly from the axis of rotation for receiving the pairs of contact surfaces therein.

7. The load cell of claim 6 wherein each of the plurality of recesses is aligned with a sensing beam.

8. The load cell of claim 7 wherein the first force-receiving end has elevated contact regions located between adjacent recesses therein.

9. The load cell of claim 8 wherein mounting holes are located in the elevated contact regions.

10. The load cell of claim 9 wherein the second force-receiving end has elevated contact regions in substantial alignment with the contact regions of the first force-receiving end.

11. The load cell of claim 10 wherein a plurality of limit posts are affixed to the second force-receiving end and further comprising a plurality of engaging posts affixed to the first force-receiving end and in alignment with the limit posts, the engaging posts being spaced from the free ends of the limit posts whereby overload gaps are established therebetween.

12. The load cell of claim 11 wherein the engaging posts each terminate with a pair of engaging surfaces spaced from the pair of contact surfaces formed on the free end of the limit post, the overload gaps are established therebetween.

13. The load cell of claim 12 wherein the sensing beams and limit posts are substantially equally spaced about the axis of rotation with the limit posts angularly displaced from the sensing beams.

* * * * *